(12) United States Patent
Järvi

(10) Patent No.: US 8,667,796 B2
(45) Date of Patent: Mar. 11, 2014

(54) TURBOCHARGER CLEANING ARRANGEMENT

(75) Inventor: Arto Järvi, Vaasa (FI)

(73) Assignee: Wartsila Finland Oy, Vaasa (FI)

( * ) Notice: Subject to any disclaimer, the term of this patent is extended or adjusted under 35 U.S.C. 154(b) by 1323 days.

(21) Appl. No.: 12/066,245

(22) PCT Filed: Aug. 30, 2006

(86) PCT No.: PCT/FI2006/050369
§ 371 (c)(1),
(2), (4) Date: Apr. 24, 2008

(87) PCT Pub. No.: WO2007/031598
PCT Pub. Date: Mar. 22, 2007

(65) Prior Publication Data
US 2008/0236150 A1 Oct. 2, 2008

(30) Foreign Application Priority Data
Sep. 16, 2005 (FI) .................................... 20055492

(51) Int. Cl.
*F02G 3/00* (2006.01)
(52) U.S. Cl.
USPC .......................................................... 60/619
(58) Field of Classification Search
USPC .......................................................... 60/619
See application file for complete search history.

(56) References Cited

U.S. PATENT DOCUMENTS

| | | | |
|---|---|---|---|
| 4,548,040 A | 10/1985 | Miller et al. | |
| 5,938,402 A * | 8/1999 | Bochud et al. | 60/619 |
| 5,944,483 A | 8/1999 | Beck | |

FOREIGN PATENT DOCUMENTS

| | | | | |
|---|---|---|---|---|
| DE | 3126678 A1 * | 1/1983 | | F02B 37/00 |
| DE | 3421355 | 12/1985 | | |
| DE | 3421355 A | 12/1985 | | |
| DE | 3421355 A1 * | 12/1985 | | F02B 37/00 |
| EP | 0781897 | 7/1997 | | |
| EP | 0848150 | 6/1998 | | |
| EP | 0994245 A2 | 4/2000 | | |
| EP | 1388656 | 2/2004 | | |
| GB | 1460675 | 1/1977 | | |
| GB | 1460675 A | 1/1977 | | |
| JP | 5844438 | 3/1983 | | |
| JP | 59119929 | 8/1984 | | |
| JP | 58044438 | 10/1984 | | |
| JP | 60034529 | 3/1985 | | |
| JP | 62016737 | 1/1987 | | |

(Continued)

OTHER PUBLICATIONS

Masaya Deguchi, Japanese Office Action for JP 2008-530554, Nov. 16, 2010.

(Continued)

*Primary Examiner* — Mary A Davis
(74) *Attorney, Agent, or Firm* — Chernoff Vilhauer McClung & Stenzel, LLP

(57) ABSTRACT

An arrangement in connection with a piston engine provided with a turbocompressor, which arrangement comprises a flow duct for conveying combustion air pressurized by a compressor to cylinders of the piston engine, an exhaust gas duct for conveying exhaust gas from the piston engine to a turbine, and means adapted in conjunction with the turbine for feeding a cleansing agent to the turbine. There are feeding means arranged in connection with the exhaust gas duct for introducing air and/or water into the exhaust gas duct for cooling the exhaust gas.

16 Claims, 3 Drawing Sheets

(56) References Cited

FOREIGN PATENT DOCUMENTS

| JP | 0831263 A | | 11/1996 | |
| JP | 08312363 A | * | 11/1996 | ............. F02B 39/16 |
| JP | 09222025 A | | 8/1997 | |
| JP | 10176540 A | | 6/1998 | |
| JP | 200064844 A | | 2/2000 | |
| JP | 2003206813 | | 7/2003 | |

OTHER PUBLICATIONS

China Patent Agent (H.K.) Ltd., Chinese Office Action for CN 200680033971.X, Nov. 6, 2009.

Notice of Final Rejection for Korean Patent Application No. 10-2008-7009097, issued Mar. 11, 2013, 7 pages.

KR Office action, Patent Application No. 10-2008-7009097 issued Sep. 19, 2012, received Sep. 20, 2012, 4 pages.

* cited by examiner

TURBOCHARGER CLEANING ARRANGEMENT

This is a national stage application filed under 35 USC 371 based on International Application No. PCT/FI2006/050369 filed Aug. 30, 2006, and claims priority under 35 USC 119 of Finnish Patent Application No. 20055492 filed Sep. 16, 2005.

BACKGROUND OF THE INVENTION

The present invention relates to an arrangement in connection with a piston engine provided with a turbocompressor.

The invention also relates to a method in connection with a piston engine provided with a turbocompressor.

It is known in the art of engine technology to use turbocompressors for increasing the engine output. A turbocompressor comprises a compressor section, by which pressurized combustion air is introduced into the engine. In addition, the turbocompressor comprises a turbine section for driving the compressor. The exhaust gases coming from the engine are led to the turbine, which converts the energy of the exhaust gases into driving power for the compressor. Carbon deposit is formed on those parts of the turbine, which come into contact with exhaust gas. Carbon build-up is intensive especially when heavy fuel oil is used as a fuel. The temperature of the turbine surfaces coming into contact with exhaust gas increases substantially, whereby the carbon deposit built on the surfaces is especially hard. Carbon build-up is particularly problematic in the region between the turbine blades and the flow duct around it, as well as in the nozzle ring located prior to the turbine blades in the flow direction of the exhaust gas. The qualities of the carbon deposit vary according to the composition of the used fuel. The problem is significant especially with heavy fuel oils containing vanadium and sodium. The carbon deposit formed on the turbine reduces the efficiency of the turbine and consequently the engine output decreases. Therefore, the contamination deposit formed on the turbine has to be removed regularly.

For cleaning the turbine, the engine may be stopped and a mechanical cleaning performed, whereby the turbocharger is dismantled and the turbine cleaned. This is, however, a very disadvantageous procedure, as it is very time-consuming. Besides, the contamination is often so heavy that this method would call for shutdowns more often than the service of the engine itself would require.

Several solutions have been developed for removing carbon deposits from the turbine surfaces, while the turbine remains in operation. In general, these can be divided into wet and dry methods, in which the cleaning is performed either by means of water injection or by mixing granular solid matter with the exhaust gases in order to clean the surfaces mechanically. One disadvantage associated with the dry methods is the simultaneous wear of the surfaces of the device to be cleaned. The effect of water injection may be either like washing, when the engine loads are low, or like a thermal shock, when used at a fairly high engine load. When the cleaning type is washing, the cleaning effect is based first on the mechanical impact of water drops and secondly, on the dissolution of the contaminant in water. Typically, this cleaning by washing requires a reduction of engine output to 30-40% of the maximum output. Cleaning, which involves a thermal shock, is, instead, based on the different thermal expansion qualities of the contamination deposit and the adherence surface as well as on the separation effect accomplished by sudden cooling. Cleaning based on a thermal shock may be performed with higher engine output than cleaning by washing.

The publication U.S. Pat. No. 5,944,483 discloses one wet cleaning method based on a thermal shock. In the method, relatively small amounts of water are injected repeatedly into the turbine so that the water strikes the nozzle ring in liquid state at a sufficiently low temperature and causes a thermal shock in the deposits. The nozzle ring is allowed to reheat between the injections back to its normal operating temperature. The device described in the publication is also applicable for turbine cleaning by washing.

During wet cleaning the exhaust gases coming to the turbine need to be at a sufficiently low temperature in order to avoid excessive vaporization of water and damage to the turbine components on account of a thermal shock. If the engine is operated at too high output, the exhaust gases entering the turbine may be too hot for wet cleaning, whereby the engine output has to be decreased for the cleaning operation. The length of the cleaning sequence for a turbine is typically about half an hour and for engines, which are in continuous operation and use fuel of poor quality, the sequence is run through as often as twice a week. The reduction in electricity production caused by the turbine cleaning, e.g. in the case of engines at power plants, may cause severe economical losses.

The object of the present invention is to provide a technical solution, by which a piston engine provided with a turbocompressor may be operated at a higher output during the cleaning of the turbine.

SUMMARY OF THE INVENTION

In the arrangement according to the invention, feeding means are adapted in conjunction with the exhaust gas duct of the piston engine, by which means air and/or water may be introduced into the exhaust gas duct during the cleaning of the turbine.

In the method according to the invention the exhaust gas to be led from the piston engine into the turbine is cooled during the cleaning of the turbine by mixing air and/or water therewith.

Considerable advantages are achieved by the present invention.

By means of the water and/or air feed, the exhaust gas to be led to the turbine may be cooled during the cleaning without decreasing the output of the engine. The engine may be operated at full output during the cleaning of the turbine, which is useful especially in power plant operation. The arrangement according to the invention is also easily and economically feasible, and it may also be installed in conjunction with existing piston engines.

BRIEF DESCRIPTION OF THE DRAWINGS

In the following, the invention is explained in more detail with reference to the examples shown in the appended drawings.

DETAILED DESCRIPTION

Figure 1:
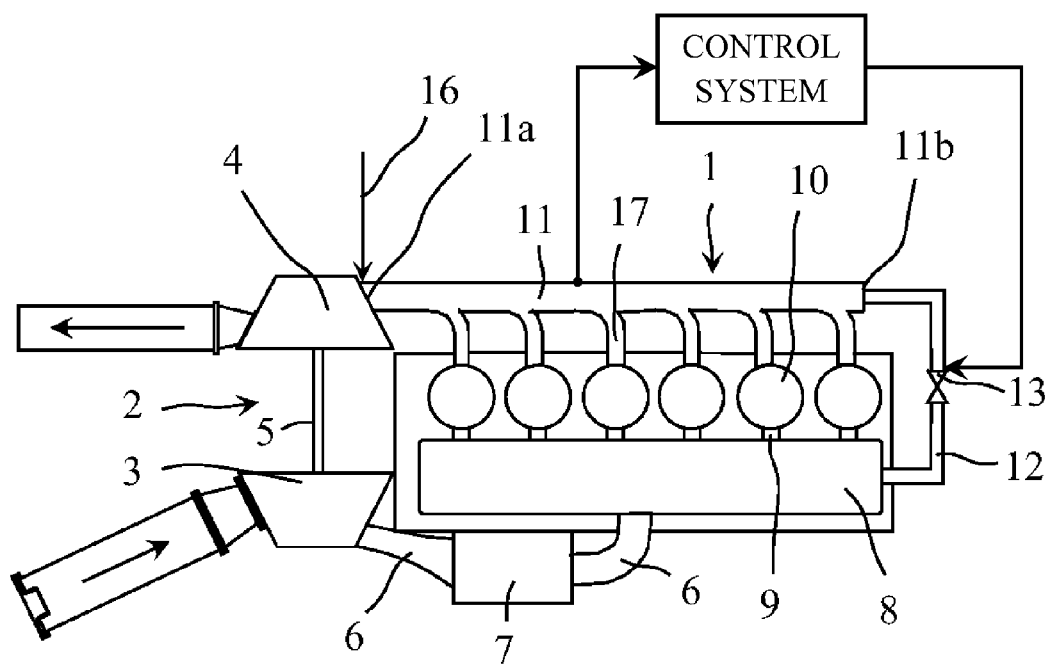
FIG. 1 is a schematic view of one embodiment according to the invention.
Figure 2:
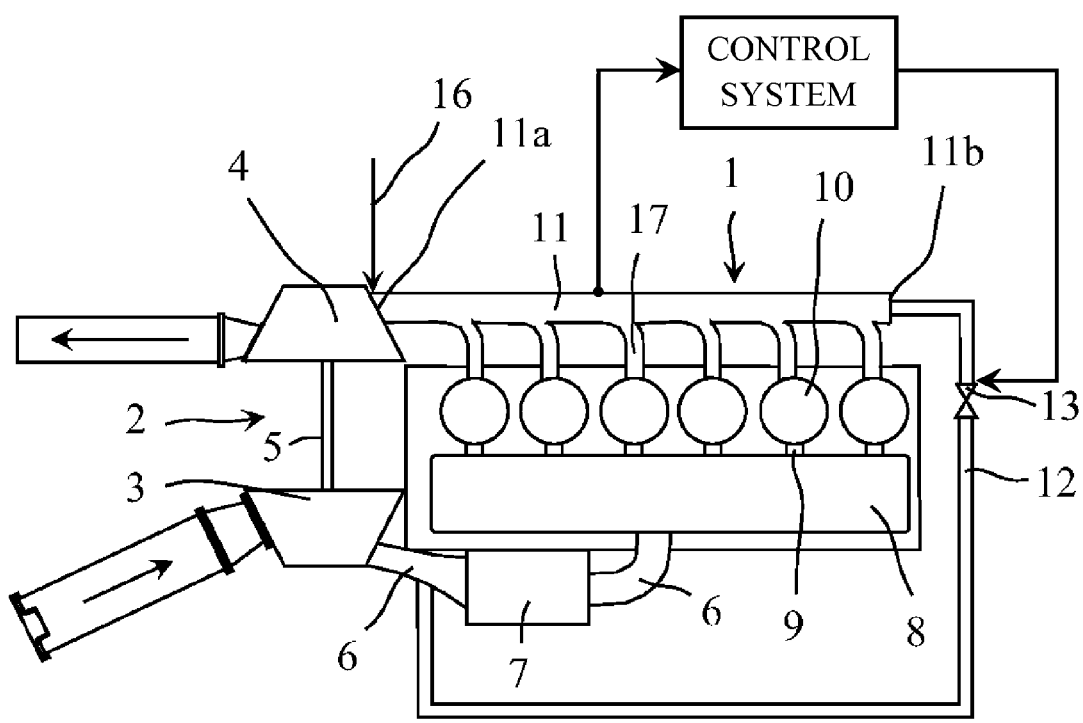
FIG. 2 is a schematic view of a second embodiment according to the invention.
Figure 3:
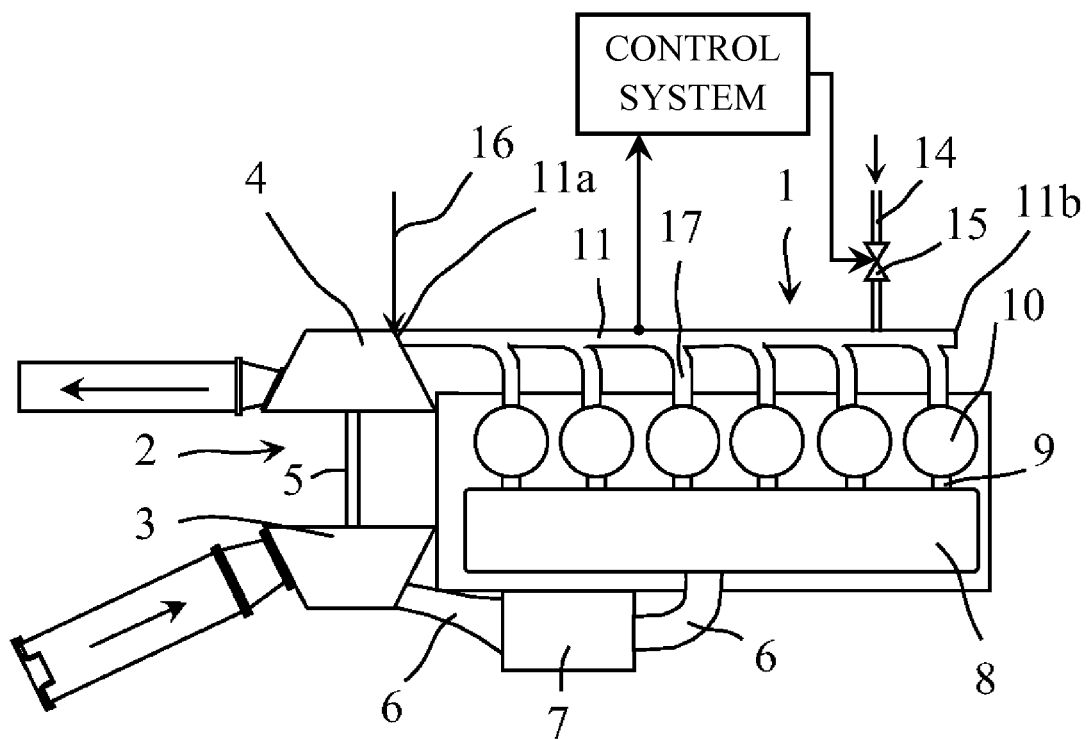
FIG. 3 is a schematic view of a third embodiment according to the invention.

FIGS. 1-3 show a piston engine 1 provided with a turbocompressor 2. The turbocompressor 2 comprises a compressor 3 and a turbine 4, which are interconnected by means of a drive shaft 5. The drive shaft 5 is attached to the housing of the turbocompressor 2 via a bearing system. The task of the compressor 3 is to feed pressurized air to the engine 1 in order to provide combustion air for the fuel. The compressor 3 comprises a rotatable rotor provided with blades for pressurizing the combustion air to be conveyed to the engine 1. A flow space 6 is adapted on the high-pressure side of the compressor 3, i.e. between the compressor 3 and the combustion spaces of the engine cylinders 10, for conveying pressurized combustion air to the cylinders 10. The flow space 6 is provided with a heat exchanger 7 for cooling or heating the combustion air. In addition, the flow space 6 comprises a charge air receiver 8, which is located after the heat exchanger 7 in the flow direction of the combustion air. The flow space 6 also comprises inlet channels 9 adapted between each cylinder 10 and the receiver 8 for conveying combustion air from the receiver 8 to the cylinders 10.

An exhaust gas duct 11 is arranged between the cylinders 10 and the high-pressure side of the turbine 4 for conveying the exhaust gases of the engine to the turbine 4. The first end 11a of the exhaust gas duct 11, i.e. the end on the turbine's side, is connected to the turbine 4. The exhaust gas duct 11 is located parallel with the row of the cylinders 10. The second end 11b of the exhaust gas duct 11, i.e. the end farthest away from the turbine, extends to the vicinity of the cylinder farthest away from the turbine 4. Each cylinder 10 is connected to the exhaust gas duct 11 by means of a branch pipe 17. The turbine 4 comprises a rotor provided with blades and rotated by the exhaust gas coming from the engine 1. Moreover, the engine 1 comprises fuel-feeding means (not shown) for supplying fuel to the cylinders 10.

In addition, the turbine 4 comprises feeding members 16 for supplying cleaning liquid to the exhaust gas duct in the turbine 4. By means of the cleaning liquid carbon deposit and/or other contaminants collected on the surfaces of the turbine 4 are removed. Carbon deposit is removed especially from the surface of the nozzle ring in the turbine 4 and from the surface of the exhaust gas duct around the rotor blades. The nozzle ring is provided with blades, which change the flow direction of the exhaust gas so that it is suitable for the rotor blades and increase the flow velocity of the exhaust gas. The feeding means 16 for the cleaning liquid comprise nozzles, from which cleaning liquid is injected to the flow duct of the exhaust gas at a point before the nozzle ring, and an arrangement for conveying cleaning liquid to the nozzles. As feeding means 16 for the cleaning liquid may be utilized e.g. the arrangement described in the U.S. Pat. No. 5,944,483, by which the turbine 4 may be cleaned by a wet cleaning method, i.e. either by the thermal shock method or the washing method.

While the engine 1 is running, combustion air is led to the compressor 3, where a rotor raises its pressure to a higher level than the ambient pressure. The pressurized air is led to the flow space 6 on the pressure side of the compressor 3. In the flow space 6 combustion air is conveyed to the heat exchanger 7 and cooled by the heat exchanger 7 typically to 40-100° C. After the cooling the combustion air is led to the charge air receiver 8. From the receiver 8 combustion air is led via the inlet channels 9 to the cylinders 10. Fuel, for instance heavy fuel oil, is fed to the cylinders 10 and combusted by means of the combustion air in the combustion spaces of the cylinders 10. Exhaust gas generated by the combustion is conveyed from the cylinders 10 through the branch pipes 17 to the exhaust gas duct 11 and through the exhaust gas duct 11 to the turbine 4. While passing through the turbine 4 the gas flow rotates the rotor of the turbine 4, the rotary motion of which is transmitted by the shaft 5 to the rotor of the compressor 3.

In order to remove the carbon deposit and/or other contaminants collected on the turbine 4, the cleaning sequence of the turbine is started. Thus, cleaning liquid, e.g. water, is injected into the turbine 4 while the engine 1 is running. Cleaning liquid is transferred by the effect of injection pressure and entrained by the exhaust gas flow over to the contaminated surfaces, such as the surface of the nozzle ring and the surface of the exhaust gas duct around the rotor. The cleaning effect of the cleaning liquid may be based on washing or on a thermal shock. In the case of cleaning by washing, the cleaning effect is based on the mechanical impact of the cleaning liquid drops and on the dissolution of the contaminant in the cleaning liquid. When the cleaning involves a thermal shock, the cleaning effect is, instead, based on the different thermal expansion qualities of the contamination deposit and its adherence surface as well as on the separation effect accomplished by sudden cooling.

When cleaning based on washing is used, the cleaning liquid is injected into the turbine in the periods of approximately 60 seconds. Between the injection periods there is pause of about 60 seconds, during which no cleaning liquid is injected. There are typically five injection periods. During the injection periods the volume flow rate of the cleaning liquid introduced into the turbine is 0.2-2 $dm^3$/s depending on the size of the turbine. The feed pressure of the cleaning liquid is about 2 bars higher than the pressure of the exhaust gas at the feed point.

Correspondingly, when cleaning based on a thermal shock is used, the length of the injection period is 2-4 seconds and there is pause of about 3 minutes between the injection periods, during which no cleaning liquid is injected. During the injection period the volume flow rate of the cleaning liquid is 0.5-5.5 $dm^3$/s depending on the size of the turbine. The feed pressure of the cleaning liquid is 2-3 bars higher than the pressure of the exhaust gas at the feed point. There are typically four injection periods.

In order to achieve an optimum cleaning result the temperature of the exhaust gas conveyed to the turbine 4 needs to be on a specific level during the cleaning sequence. A measuring device located in the exhaust gas duct 11 measures the temperature of the exhaust gas going to the turbine 4. In the cleaning based on washing, the temperature of the exhaust gas conveyed to the turbine 4 has to be typically less than 450° C., and in conjunction with thermal shock cleaning less than 500° C. Nevertheless, in the thermal shock cleaning the temperature of the exhaust gas needs to exceed 430° C. When the engine 1 is running at full output, the temperature of the exhaust gas coming to the turbine 4 is typically 520-600° C., and therefore the output of the engine has to be decreased in order to lower the temperature of the exhaust gases or the exhaust gases need to be cooled down during the cleaning sequence. FIGS. 1 and 2 show solutions for cooling the exhaust gas to be led to the turbine 4 during the cleaning of the turbine. The cleaning of the turbine 4 may be performed while the engine 1 is running at full output.

FIG. 1 shows one embodiment according to the invention for cooling the exhaust gas to be led to the turbine during the cleaning sequence of the turbine 4. In the embodiment air led from the high-pressure side of the compressor 2, i.e. from the flow space 6, is mixed with the exhaust gas. The air mixed with the exhaust gas has preferably been cooled with the heat exchanger 7. The arrangement according to FIG. 1 for cooling the exhaust gas comprises a by-pass channel 12 for conveying combustion air from the flow duct 6 to the exhaust gas duct 11. The first end of the by-pass channel 12 opens to the flow space 6 at a point after the heat exchanger 7 in the flow direction of the air, e.g. at the charge air receiver 8. The second end of the by-pass channel 12 opens to the exhaust gas duct 11, preferably at a point between the branch pipe 17 closest to the turbine 4 and the second end 11*b* of the exhaust gas duct. In the embodiment of FIG. 1 the second end of the by-pass channel 12 opens to the second end 11*b* of the exhaust gas duct. The by-pass channel 12 is provided with a valve 13, by which the airflow through the by-pass channel 12 is allowed or prevented. In addition, the airflow rate passing through the by-pass channel 12 is controlled by the valve 13. From the by-pass channel 12 combustion air is led to a point between the branch pipe 17 closest to the turbine 4 and the second end 11*b* of the exhaust gas duct. In the embodiment of FIG. 1 combustion air is led to the second end 11*b* of the exhaust gas duct.

At the beginning of the cleaning sequence of the turbine, i.e. the first period of feeding a cleaning agent, the valve 13 is opened, whereby pressurized air flows from the receiver 8 via the by-pass channel 12 to the exhaust gas duct 11. A control system controls the valve 13, and thus the amount of air to be led to the exhaust gas duct 11, on the basis of the measurement of the temperature of the exhaust gas going to the turbine 4. The valve 13 adjusts the airflow rate so that the temperature of the exhaust gas going to the turbine 4 is suitable for the selected cleaning method (cleaning based on washing or on a thermal shock). If necessary, the air supply to the exhaust gas duct 11 is started for instance 5-10 minutes before starting the cleaning sequence. The air feed from the by-pass channel 12 to the exhaust gas duct 11 is stopped by closing the valve 13, when the cleaning sequence is over, i.e. after the last period of feeding a cleaning agent. Typically, the mass flow rate of the air to be led from the by-pass channel 12 to the exhaust gas duct 11 is 10-20% of the mass flow rate of the exhaust gas to be led to the turbine 4. If the air feed does not lower the temperature of the exhaust gas going to the turbine 4 to a sufficient extent, the temperature of the exhaust gas is lowered further by reducing the load of the engine 1.

FIG. 2 shows an embodiment, in which the first end of the by-pass channel 12 opens to the flow duct 6 at a point between the compressor 3 and the heat exchanger 7. Uncooled air, the temperature of which is typically 200-230° C., is led to the exhaust gas duct 11 from the flow duct 6. As for the rest of the embodiment according to FIG. 2, its construction and operation corresponds to those of the embodiment of FIG. 1.

FIG. 3 shows a third embodiment of the invention for cooling the exhaust gas to be led to the turbine 4 during the cleaning sequence of the turbine 4. In this embodiment water is introduced into the exhaust gas duct 11 from a feed line 14, the water is mixed with the exhaust gas and, when vaporized, it cools the exhaust gas. The feed line 14 opens to the exhaust gas duct 11. Preferably, the feed line 14 opens to the exhaust gas duct 11 at a point between the branch pipe 17 closest to the turbine 4 and the second end 11*b* of the exhaust gas duct. In the embodiment of FIG. 3 the feed line 14 opens to a point between two branch pipes 17 located farthest away from the turbine 4. The feed line 14 is provided with a valve 15, by which the water feed to the exhaust gas duct 11 is allowed or prevented, and the water feed rate is regulated. The end of the feed line 14 is provided with a nozzle, by which the water to be introduced into the exhaust gas duct 11 is atomized into droplets in order to facilitate the vaporization. Water is supplied to such a distance from the turbine 4 that the amount of water to be fed has time to vaporize completely or to an essential extent, or partially before entering the turbine 4. Water is introduced into the exhaust gas duct 11 at a point between the branch pipe 17 closest to the turbine 4 and the second end 11*b* of the exhaust gas duct. In the embodiment of FIG. 3 water is fed to a point between two branch pipes 17 located farthest away from the turbine 4.

At the beginning of the cleaning sequence of the turbine the valve 15 is opened, whereby water flows from the feed line 14 to the exhaust gas duct 11. A control system controls the valve 15, and thus the water flow rate to the exhaust gas duct 11, on the basis of the measurement of the temperature of the exhaust gas going to the turbine 4. The valve 15 adjusts the water flow so that the temperature of the exhaust gas going to the turbine 4 is suitable for the cleaning method to be used. Typically, the ratio of the respective mass flow rates of the water to be introduced into the exhaust gas duct 11 and the combustion air to be supplied to the cylinders 10 is between 0.05 and 0.2. The water feed is started before starting the cleaning sequence, whereby the temperature of the surfaces of the turbine 4 in contact with the exhaust gas has time to fall prior to the start of the cleaning sequence, i.e. the first period of introducing a cleaning agent. The introduction of water into the exhaust gas duct 11 is started for instance 5-10 minutes before starting the cleaning sequence. The water feed from the feed line 14 into the exhaust gas duct 11 is stopped by closing the valve 15, when the cleaning sequence has stopped, i.e. after the last period of introducing a cleaning agent.

The invention has embodiments that differ from the above-described ones.

The engine 1 may be provided with both the air feed arrangement according to FIG. 1 or 2 and the water feed system according to FIG. 3. By using both air and water cooling simultaneously it is possible to cool the exhaust gas going to the turbine 4 more efficiently.

The above-described solutions for cooling exhaust gas may also be used in connection with a cleaning sequence for turbine provided with dry cleaning. During a dry cleaning sequence the temperature of the exhaust gas to be led to the turbine has to be sufficiently low in order to prevent combustion of the granules used in dry cleaning.

The invention claimed is:

1. A piston engine provided with a turbocompressor including a compressor for compressing combustion air and an exhaust gas turbine coupled to drive the compressor, said piston engine comprising:
   a flow duct for conveying combustion air pressurized by the compressor to cylinders of the engine,
   an exhaust gas duct for conveying exhaust gas from the engine to the turbine,
   at least one nozzle provided in connection with the turbine for injecting a cleansing agent into the turbine during a cleaning sequence,
   a feeding means for introducing an amount of air and/or water into the exhaust gas duct for cooling the exhaust gas during the cleaning sequence,
   a temperature measuring device for measuring temperature of the exhaust gas conveyed by the exhaust gas duct to the turbine, and
   a control system for controlling said amount of air and/or water introduced into the exhaust gas duct depending on the temperature measured by the temperature measuring device.

2. A piston engine according to claim 1, wherein the feeding means comprises a bypass channel having a first end that opens to the flow duct and an opposite second end that opens to the exhaust gas duct.

3. A piston engine according to claim 2, wherein a heat exchanger is positioned in the flow duct for cooling the compressed combustion air and the first end of the bypass channel opens to the flow duct between the heat exchanger and the cylinders of the engine.

4. A piston engine according to claim 2, wherein a heat exchanger is positioned in the flow duct for cooling the compressed combustion air and the first end of the bypass channel opens to the flow duct between the compressor and the heat exchanger.

5. A piston engine according to claim 1, wherein the feeding means comprises a feed line opening to the exhaust gas duct for introducing water into the exhaust gas duct.

6. A piston engine according to claim 5, wherein the cylinders are connected to the exhaust gas duct at respective locations along the exhaust gas duct, and the feed line opens to the exhaust gas duct at a location between the two cylinder connections that are located farthest away from the turbine.

7. A piston engine according to claim 1, comprising a valve for controlling introduction of air and/or water into the exhaust gas duct, and wherein the control system controls the valve depending on the temperature measured by the temperature measuring device.

8. A method of operating a piston engine that comprises a turbocompressor including a compressor and an exhaust gas turbine coupled to drive the compressor, said method comprising:
   employing the compressor to compress combustion air,
   feeding compressed combustion air to the piston engine,
   combusting fuel supported by the compressed combustion air,
   conveying exhaust gas from the engine to the turbine,
   measuring temperature of the exhaust gas conveyed from the engine to the turbine,
   cooling the exhaust gas during a cleaning sequence by adding air and/or water to the exhaust gas upstream of the turbine in an amount that depends on the measured temperature of the exhaust gas, and
   injecting a cleansing agent into the turbine during the cleaning sequence.

9. A method according to claim 8, comprising cooling the exhaust gas by mixing combustion air with the exhaust gas.

10. A method according to claim 8, comprising cooling the exhaust gas by mixing compressed combustion air with the exhaust gas.

11. A method according to claim 8, comprising cooling the compressed combustion air and cooling the exhaust gas by mixing cooled combustion air with the exhaust gas.

12. A method according to claim 8, comprising cooling the exhaust gas by adding water to the exhaust gas at a sufficient distance from the turbine that the added water vaporizes completely before entering the turbine.

13. A method according to claim 8, comprising controlling a valve that controls addition of air and/or water to the exhaust gas stream of the turbine depending on the measured temperature of the exhaust gas.

14. A method of operating a piston engine that comprises a turbocompressor including a compressor and an exhaust gas turbine coupled to drive the compressor, said method comprising:
   employing the compressor to compress combustion air,
   feeding compressed combustion air to the piston engine,
   combusting fuel supported by the compressed combustion air,
   conveying exhaust gas from the engine to the turbine, and
   periodically initiating a cleaning sequence that includes injecting a cleansing agent into the turbine,
   measuring temperature of the exhaust gas conveyed from the engine to the turbine, and
   cooling the exhaust gas during the cleaning sequence by adding air and/or water to the exhaust gas upstream of the turbine in an amount that depends on the measured temperature of the exhaust gas.

15. A method according to claim 14, comprising cooling the exhaust gas by adding water to the exhaust gas at a sufficient distance from the turbine that the added water vaporizes completely before entering the turbine.

16. A method according to claim 14, comprising controlling a valve that controls addition of air and/or water to the exhaust gas stream of the turbine depending on the measured temperature of the exhaust gas.

* * * * *